United States Patent
Yang et al.

(10) Patent No.: US 7,881,687 B2
(45) Date of Patent: Feb. 1, 2011

(54) METHOD AND SYSTEM FOR REMOVING RADIO FREQUENCY DIRECT CURRENT OFFSET IN SIGNAL

(75) Inventors: Jing Yang, Shenzhen (CN); Yu Liu, Shenzhen (CN); Gengshi Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 651 days.

(21) Appl. No.: 11/848,001

(22) Filed: Aug. 30, 2007

(65) Prior Publication Data

US 2008/0076376 A1    Mar. 27, 2008

(30) Foreign Application Priority Data

Sep. 25, 2006   (CN) ................... 2006 1 0152677

(51) Int. Cl.
*H04B 1/10* (2006.01)
*H04B 17/00* (2006.01)

(52) U.S. Cl. .................. 455/296; 455/226.1; 455/67.11

(58) Field of Classification Search .............. 455/307, 455/232.1, 234.2, 223.1, 245.1, 239.1, 240.1, 455/296, 278.1, 67.11, 226.1; 327/307, 318, 327/362, 378; 375/319, 346, 350
See application file for complete search history.

(56) References Cited

U.S. PATENT DOCUMENTS

| | | | |
|---|---|---|---|
| 6,225,848 B1 * | 5/2001 | Tilley et al. ................. | 327/307 |
| 6,434,204 B1 * | 8/2002 | Amir et al. ................... | 375/346 |
| 6,985,711 B2 * | 1/2006 | Holenstein et al. .......... | 455/312 |
| 7,167,530 B2 * | 1/2007 | Koomullil et al. ........... | 375/329 |
| 7,212,797 B2 * | 5/2007 | Filipovic .................. | 455/234.2 |
| 7,215,266 B2 * | 5/2007 | Li et al. ...................... | 341/118 |
| 2003/0138032 A1 | 7/2003 | Shi et al. | |
| 2003/0202618 A1 | 10/2003 | Jensen et al. | |
| 2004/0081256 A1 | 4/2004 | Shi et al. | |

OTHER PUBLICATIONS

1st Chinese Office action from the Chinese Patent Office in corresponding Chinese Patent Application No. 2006101526772 (Feb. 6, 2009).

* cited by examiner

*Primary Examiner*—Sonny Trinh
(74) *Attorney, Agent, or Firm*—Leydig, Voit & Mayer, Ltd.

(57) ABSTRACT

Embodiments of the present invention provide a method and a system for removing a Radio Frequency (RF) Direct Current (DC) offset in a signal. The method includes: subtracting a canceling DC from a signal carrying an RF DC offset and generating an RF DC offset residual; outputting the signal when the RF DC offset residual in the signal is zero; adjusting the canceling DC according to the RF DC offset residual in the signal if the RF DC offset residual is not zero. The system includes a receiver, an RF DC offset canceling unit, a determining unit, a canceling DC adjusting unit, and an output unit. With embodiments of the present invention, the RF DC offset in the signal may be effectively removed.

15 Claims, 3 Drawing Sheets

METHOD AND SYSTEM FOR REMOVING RADIO FREQUENCY DIRECT CURRENT OFFSET IN SIGNAL

This application claims priority to Chinese Patent Application No. 200610152677.2, filed Sep. 25, 2006, which is hereby incorporated by reference.

FIELD OF THE TECHNOLOGY

The present invention relates to network communication technologies, and more particularly to a method and a system for removing a Radio Frequency (RF) Direct Current (DC) offset in a signal.

BACKGROUND OF THE INVENTION

In a radio communication system, an RF receiver contains a homodyne receiver. The homodyne receiver produces an RF DC which deteriorates the quality of a signal and even causes saturation in post stage.

The value of the RF DC is influenced by such factors as, a receiving channel gain, a fading condition, a temperature and a receiving frequency (for a Frequency Modulation (FM) receiver). Any changes of these factors result in a change in the value of the RF DC. These factors affect the RF DC in different degrees, and the receiving channel gain deteriorates the RF DC most. If there is a transient in the receiving channel gain, a remarkable transient will be produced in the RF DC. Since the receiving channel gain in a communication receiver changes constantly, the RF DC also changes continuously with the receiving channel gain. When designing an RF DC canceling circuit, it is necessary to consider these factors which affect the value of the RF DC.

The RF DC harms the performance of different systems in different degrees, and the following table shows emulated performance harm that the RF DC does to a WCDMA system:

TABLE 1

List of performance losses which are caused by a variety of RF DCs

| The Value of the RF DC | DPCH working point | Performance loss relative to the zero RF DC |
| --- | --- | --- |
| 0 | −14.17 dB | — |
| 25 mv | −13.03 dB | 1.14 dB |
| 50 mv | −10.78 dB | 3.39 dB |
| 1.0/32.0 v | −12.59 dB | 1.58 dB |
| 1.0/64.0 v | −13.00 dB | 1.17 dB |
| 1.0/128.0 v | −13.95 dB | 0.22 dB |
| 1.0/256.0 v | −14.05 dB | 0.12 dB |
| 1.0/512.0 v | −14.11 dB | 0.06 dB |
| 1.0/1024.0 v | −14.15 dB | 0.02 dB |

As shown in table 1, the performance of the system deteriorates rapidly with an increase in the value of the RF DC.

The RF DC may be removed using a conventional method of an offset adjustment shown in FIG. 1, a conventional method of a fine gain digital cancellation loop shown in FIG. 2 respectively, or a method combined by the two.

The principle of the method of the offset adjustment shown in FIG. 1 is testing the value of the RF DC under a certain condition in advance, calling the value of the RF DC by a register under the same condition, and removing an RF DC in an input signal.

In the method of the fine gain digital cancellation loop shown in FIG. 2, the input signal is filtered using the fine gain digital cancellation loop which acts as a high-pass filter for directly filtering out RF DC offsets in the input signal.

A third method is obtained by combining the two methods. The RF DC offset in the input signal is removed by the method of the offset adjustment, i.e. the RF DC is called from the register to remove the RF DC offset in the input signal. The input signal processed by the RF DC is output to the fine gain digital cancellation loop, the input signal is high-pass filtered so as to filter the RF DC in the input signal.

Although the three conventional methods may remove the RF DC offset in the signal, they have their own shortcomings which are respectively described as follows.

When using the method of the offset adjustment, because the RF DC is affected by the receiving channel gain, the fading condition, the temperature, the receiving frequency of the FM receiver and chip technology, it is difficult to perfectly measure the value of the RF DC under a certain condition, and it is unrealistic to measure all conditions. It may be done by testing major factors which affect the RF DC, but the RF DC may not be removed effectively using the method.

When using the method of the fine gain digital cancellation loop, the narrower the filtering stop-band of the fine gain digital cancellation loop acting as a high-pass filter is, the less harm of the filtration to the performance of the system is, and the longer the digital transient response time is. For example, if there is a transient in the RF DC of the input signal, it takes a long time for the high-pass filter to effectively filter the RF DC. If the period of the transient in the RF DC of the input signal is quite short, the fine gain digital cancellation loop cannot work stably.

As for the third method, although the input signal processed by the method of the offset adjustment is high-pass filtered later, due to inherent drawbacks of the method of the fine gain digital cancellation loop, the problem that the RF DC is unable to be quickly filtered due to the transient in the RF DC of the signal, i.e. the problem existing in the method of the fine gain digital cancellation loop may still exist.

Thus, the conventional schemes may not effectively remove the RF DC offset in the signal.

SUMMARY

The embodiments of the present invention are to provide a method and a system for removing an RF DC offset in a signal.

A method for removing an RF DC in a signal includes:

subtracting a canceling DC from a signal carrying an RF DC offset and generating an RF DC offset residual;

outputting the signal when the RF DC offset residual in the signal is zero;

adjusting the canceling DC according to the RF DC offset residual in the signal when the RF DC offset residual is not zero.

A system for removing an RF DC offset in a signal includes:

a receiver, configured to receive a signal carrying an RF DC offset;

an RF DC offset canceling unit, configured to subtract a canceling DC from the signal and generate an RF DC offset residual;

a determining unit, configured to determine whether the RF DC offset residual in the signal is zero;

a canceling DC adjusting unit, configured to adjust the canceling DC according to the RF DC offset residual in the signal if the RF DC offset residual in the signal is not zero;

an output unit, configured to output the signal if the RF DC offset residual in the signal is zero.

A system for removing an RF DC offset in a signal includes:

a receiver, configured to receive a signal carrying an RF DC offset;

an RF DC offset canceling unit, configured to subtract a canceling DC from the signal carrying an RF DC offset and generate an RF DC offset residual;

a filter, configured to high-pass filter the signal carrying the RF DC offset residual and output the signal high-pass filtered with the RF DC offset residual;

a canceling DC adjusting unit, configured to adjust the canceling DC according to the RF DC offset residual in the signal.

A system for removing an RF DC offset in a signal includes:

a receiver, configured to receive a signal carrying an RF DC offset;

an RF DC offset canceling unit, configured to subtract a canceling DC from the signal and generate an RF DC offset residual;

a canceling DC adjusting unit, configured to adjust the canceling DC according to the RF DC offset residual in the signal if the RF DC offset residual in the signal is larger than a threshold;

an output unit, configured to output the signal if the RF DC offset in the signal is equal to or less than the threshold.

According to solutions of the embodiments of the present invention, the RF DC is set corresponding to each of the gain combinations, most of the RF DC offsets may be removed by subtracting the canceling DC from the signal. In an embodiment of the present invention, an output signal with better performance is obtained by filtering the signal to remove the RF DC offset in the signal. Another embodiment of the present invention also filters out RF DC offsets residual using a plurality of filters. RF DC offsets residual are carried in the signals with different gain combinations. The problem that the output signal is hard to be stable due to transients in the signals with different gain combinations, i.e. a overlong instantaneous time caused by transients in values of the RF DC in different signals, is avoided.

DETAILED DESCRIPTION OF THE INVENTION

Figure 1:
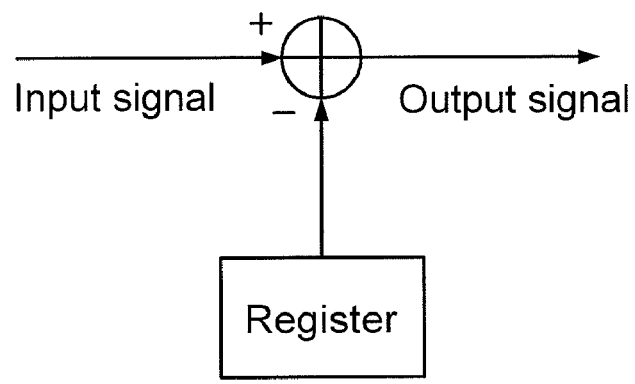
FIG. 1 is a schematic diagram illustrating a conventional method of an offset adjustment.
Figure 2:
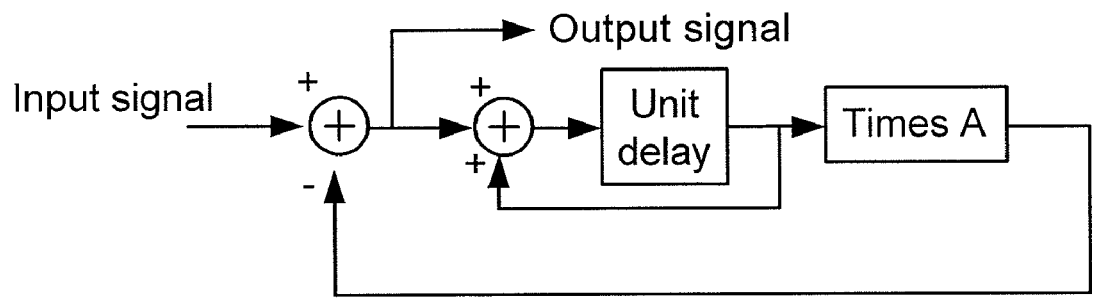
FIG. 2 is a schematic diagram illustrating a conventional method of a fine gain digital cancellation loop.

In an embodiment of the present invention, after an RF DC offset in a signal is removed using a canceling DC, the canceling DC is then adjusted according to an RF DC offset residual in the signal, and an RF DC offset in a newly received signal is removed using the canceling DC adjusted. It is noted that removing the RF DC offset in a signal using the canceling DC refers to subtracting the canceling DC from the signal.

In detail, an embodiment of the present invention mainly includes: subtracting the canceling DC from the signal, high-pass filtering the signal, outputting the signal high-pass filtered and an RF DC offset residual; adjusting the canceling DC with the RF DC offset residual and removing an RF DC offset in a newly received signal with the canceling DC adjusted.

In one embodiment of the present invention, first it is necessary to detect various gain combinations of an RF variable amplifier and an analog Base Band (BB) amplifier, to set and save different canceling DCs corresponding to each of the gain combinations.

The method of subtracting the canceling DC from the signal for removing the RF DC offset in the signal includes:

A gain combination of an RF variable amplifier and an analog BB is detected. The RF variable amplifier and the analog BB are correlated with a signal. A canceling DC corresponding to the gain combination is selected from the different canceling DCs, and the signal subtracts the canceling DC selected so as to remove an RF DC offset in the signal.

Processed by a canceling DC, the RF DC offset in the signal may be completely or partly removed in some cases. RF DC offsets may still reside in the signal.

In order to remove the RF DC offset residual likely to be existing, an embodiment of the present invention may high-pass filter the signal processed by the canceling DC so as to filter out the RF DC offset residual. The signal and the RF DC offset residual are output after high-pass filtration. The RF DC offset residual is added to the canceling DC corresponding to the signal, i.e., the value of the canceling DC is adjusted using the RF DC offset residual so as to make it more close to the RF DC offset in a new signal, so that the RF DC offset in the new signal may be removed by the canceling DC adjusted as much as possible.

The new signal subtracts the canceling DC adjusted to remove the RF DC offset.

In the high-pass filtration, since the values of RF DC offsets in different signals are different, the values of the RF DC offsets residual in the different signals may still be different after the procession of the canceling DC. When there is a remarkable transient in the value of the RF DC offset residual, it takes a long time for a high-pass filter to be re-stabilized, which deteriorates the performance of the system.

In view of the problem mentioned above, an embodiment of the present invention further sets a high-pass filter corresponding to each of the gain combinations of the RF amplifier and the analog BB amplifier, and inputs signals into the corresponding high-pass filter according to gain combination. In this way, there is less transient in the RF DC offset residual input into each high-pass filter, the high-pass filters work more stably, and the performance of the system is less affected.

A further detailed description is hereinafter given to the solution provided by embodiments of the present invention with reference to accompanying drawings.

Figure 3:
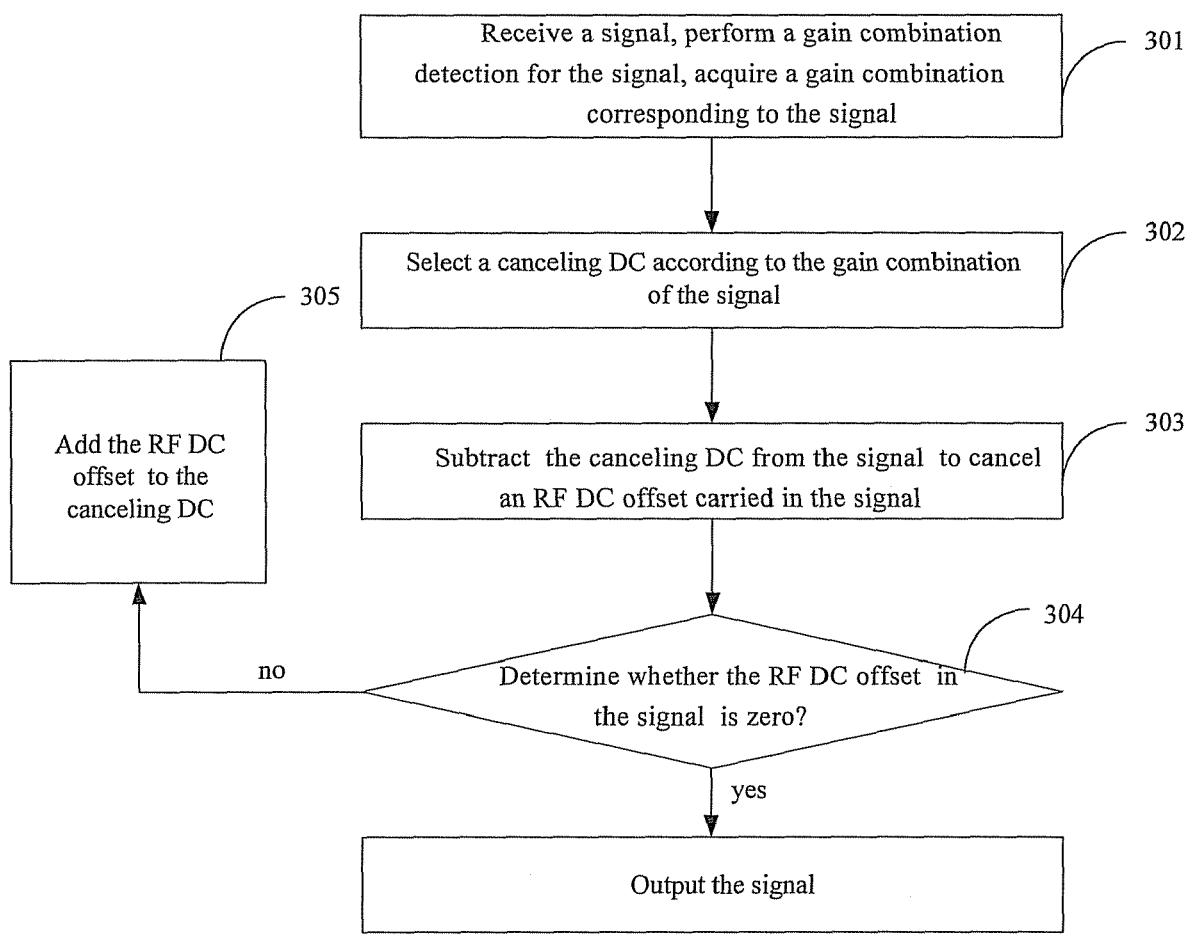
FIG. 3 is a simplified flow chart illustrating a method according to an embodiment of the present invention.

FIG. 3 is a simplified flow chart illustrating a method according to an embodiment of the present invention. The method for removing the RF DC offset includes:

Block 301: A signal carrying an RF DC offset is received and the gain combination of the signal is tested and obtained.

Block 302: A canceling DC corresponding to the gain combination is selected.

Block 303: The signal subtracts the canceling DC to remove the RF DC offset carried in the signal and generates an RF DC offset residual.

Block 304: It is determined whether the RF DC offset residual in the signal is zero. If the RF DC offset residual is zero, the signal subtracted by the canceling DC is output. Otherwise Block 305 is performed.

Block 305: The RF DC offset residual in the signal is added to the canceling DC to adjust the value of the canceling DC.

The value of the canceling DC is made more close to the RF DC offset residual to remove the RF DC offset residual accurately. The adding time between the RF DC offset residual and the canceling DC is the settling time of a high-pass filter.

The method provided in an embodiment of the present invention may also include the following steps before Block 301.

Gain combinations of an RF variable amplifier and an analog BB variable amplifier are tested, and all the gain combinations likely to appear are obtained.

The canceling DCs are set for each of the gain combinations to remove the RF DC offset in the signal, and the canceling DCs are set corresponding to each of the gain combinations.

The canceling DCs are saved.

In an embodiment of the present invention, in order to better remove the RF DC offset in the signal, the method further includes following steps after Block 303.

The RF DC offset residual is high-pass filtered out. Preferably, a high-pass filter adopted in an embodiment of the present invention is a fine gain digital cancellation loop. After high-pass filtration, there will be less RF DC offset in the signal. The quality of the signal is further improved.

A gain combination type transient occurs if signals with different gain combinations are input into one high-pass filter, in this way, unsteadiness occurs when the high-pass filter filters the signal. In order to attain better filtration effect, the method further includes the following processes before high-pass filtering the signal which carries the RF DC.

For each of the gain combinations, a high-pass filter uniquely corresponding to each of the gain combinations is set, and a plurality of high-pass filters sharing one multi-channel selector and multiplexer.

Figure 4:
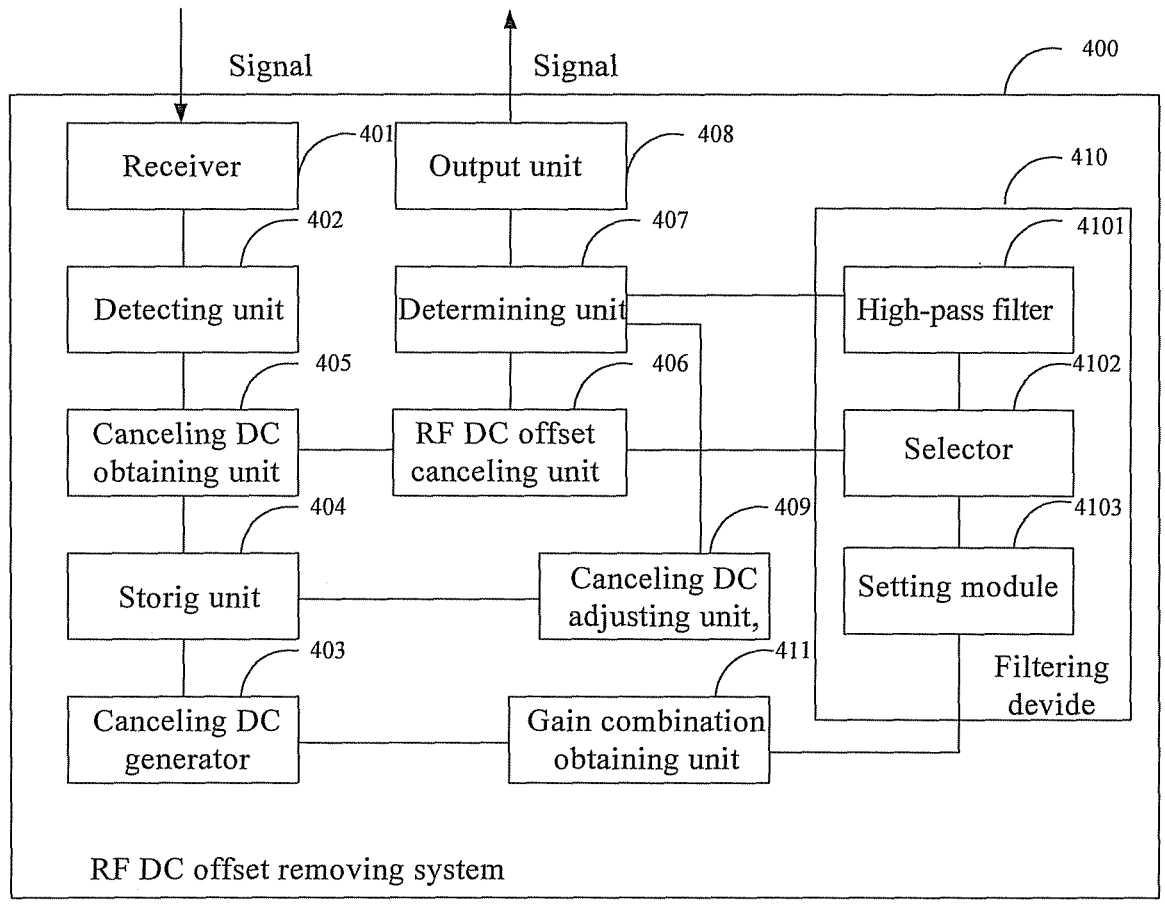
FIG. 4 is a schematic diagram illustrating the architecture of a system according to an embodiment of the present invention.

FIG. 4 is a schematic diagram illustrating the architecture of a system according to an embodiment of the present invention. A system 400 includes a receiver 401, a detecting unit 402, a canceling DC obtaining unit 405, an RF DC offset canceling unit 406, a determining unit 407, an output unit 408, and a canceling DC adjusting unit 409.

The receiver 401 is configured to receive a signal.

The detecting unit 402 is configured to test and obtaining a gain combination corresponding to the signal.

The canceling DC obtaining unit 405 is configured to select a canceling DC according to the gain combination of the signal.

The RF DC offset canceling unit 406 is configured to subtract the canceling DC from the signal to remove an RF DC offset carried in the signal.

The determining unit 407 is configured to determine whether the RF DC offset residual in the signal is zero.

The canceling DC adjusting unit 409 is configured to, when the RF DC offset residual in the signal is not zero, add the RF DC offset residual in the signal to the canceling DC, adjust the value of the canceling DC to make it more close to the RF DC offset residual in a new signal.

The output unit 408 is configured to, when the RF DC offset residual in the signal is zero, output the signal.

According to an embodiment of the present invention, the system 400 further includes a gain combination obtaining unit 411, a canceling DC generator 403 and a storing unit 404.

The gain combination obtaining unit 411 is configured to detect and obtain gain combinations of an RF variable amplifier and an analog BB variable amplifier of the signal.

The canceling DC generator 403 is configured to set, for each of the gain combinations, a canceling DC for removing the RF DC offset residual in the signal.

The storing unit 404 is configured to save the canceling DC corresponding to each of the gain combinations.

In order to better remove the RF DC offset in the signal, the system provided by an embodiment of the present invention further includes a filtering device 410 which is configured to high-pass filter the signal which carries the RF DC offset to obtain the signal with less RF DC offset and the RF DC offset residual used by the canceling DC adjusting unit 409.

The filtering device 410 includes: a selector 4102 and a high-pass filter 4101.

The selector 4102 is configured to select a high-pass filter corresponding to the gain combination.

The high-pass filter 4101 is configured to make a high-pass filtration of the signal which carries the RF DC offset residual.

The filtering device 410 further includes a setting module 4103 for setting, for each of the gain combinations, a high-pass filter uniquely corresponding to the gain combination.

An embodiment of the present invention provides a system for removing an RF DC in a signal. The system includes a receiver, an RF DC offset canceling unit, a detecting unit, a canceling DC obtaining unit, a gain combination obtaining unit, a canceling DC generator, a storing unit and a filter.

The receiver is configured to receive a signal. The signal carries an RF DC offset.

The RF DC offset canceling unit is configured to receive the signal from the receiver, subtract a canceling DC from the signal and generate an RF DC offset residual. The RF DC offset residual refers to the RF DC offset carried in the signal after being subtracted by the canceling DC.

The filter is configured to high-pass filter the signal carrying the DC offset residual to obtain the signal being high-pass filtered, and output the signal.

It is noted that the RF DC offset residual is used to adjust the canceling DC. The system may further includes a canceling DC adjusting unit, the canceling DC adjusting unit uses the RF DC offset residual to adjust the canceling DC.

The detecting unit is configured to detect a gain combination. The gain combination corresponds to the signal.

The canceling DC obtaining unit is configured to select the canceling DC according to the gain combination.

The gain combination obtaining unit is configured to detect gain combinations of an RF variable amplifier and an analog BB variable amplifier corresponding to the signal.

The canceling DC generator is configured to set a canceling DC for each of the gain combinations.

The storing unit is configured to store canceling DCs. The canceling DCs correspond to gain combinations.

An embodiment of the present invention also provides a system for removing an RF DC offset in a signal. The system includes a receiver, an RF DC offset canceling unit, a canceling DC adjusting unit, an output unit, a detecting unit, a canceling DC obtaining unit, a gain combination obtaining unit, a canceling DC generator, and a storing unit.

The receiver is configured to receive a signal. The signal carries an RF DC offset.

The RF DC offset canceling unit is configured to subtract a canceling DC from the signal.

The RF DC offset residual in the signal is tested. If the RF DC offset residual in the signal is larger than a threshold, the canceling DC adjusting unit is configured to adjust the canceling DC using the RF DC offset residual in the signal. The threshold is a preset value. The method of adjusting the canceling DC is adding the RF DC offset residual to the canceling DC to obtain a new canceling DC.

If the RF DC offset residual in the signal is equal to or less than the threshold, the output unit outputs the signal.

The detecting unit is configured to detect a gain combination. The gain combination corresponds to the signal.

The canceling DC obtaining unit is configured to select the canceling DC according to the gain combination.

The gain combination obtaining unit is configured to detect gain combinations of an RF variable amplifier and an analog BB variable amplifier corresponding to the signal.

The canceling DC generator is configured to set a canceling DC for each of the gain combinations.

The storing unit is configured to store canceling DCs. The canceling DCs correspond to gain combinations.

It should be emphasized that the above-described embodiments, particularly, any 'preferred' embodiments, are merely possible examples of implementations, merely set forth for a clear understanding of the principles of the invention. Many variations and modifications may be made to the above-described preferred embodiments without departing substantially from the spirit and principles of the invention. All such modifications and variations are intended to be included herein within the scope of this disclosure and the above-described preferred embodiments and protected by the following claims.

The invention claimed is:

1. A method for removing a Radio Frequency (RF) Direct Current (DC) offset in a second signal carrying an RF DC offset, comprising:
   detecting gain combinations of an RF variable amplifier and an analog Base Band (BB) variable amplifier corresponding to a first signal correlating with the RF variable amplifier and the analog BB;
   setting and storing a canceling DC corresponding to each of the gain combinations;
   subtracting a canceling DC corresponding to the gain combination corresponding to the second signal carrying the RF DC offset from the second signal carrying an RF DC offset and generating an RF DC offset residual;
   outputting the second signal subtracted the canceling DC, when the RF DC offset residual in the second signal is zero;
   adjusting the canceling DC according to the RF DC offset residual in the second signal if the RF DC offset residual in the second signal is not zero.

2. The method of claim 1, further comprising:
   detecting and obtaining the gain combination corresponding to the second signal carrying an RF DC offset;
   selecting the canceling DC according to the gain combination corresponding to the second signal carrying an RF DC offset.

3. The method of claim 1, further comprising:
   high-pass filtering the signal which carries the RF DC offset residual.

4. The method of claim 1, further comprising:
   setting a high-pass filter uniquely corresponding to each of the gain combinations;
   selecting the high-pass filter according to the gain combination corresponding to the second signal;
   high-pass filtering the second signal which carries the RF DC offset residual.

5. The method of claim 1, wherein adjusting the canceling DC according to the RF DC offset residual in the signal comprises:
   adding the RF DC offset residual to the canceling DC.

6. A system for removing an RF DC offset in a second signal carrying an RF DC offset, comprising:
   a gain combination obtaining unit, configured to detect gain combinations of an RF variable amplifier and an analog Base Band (BB) variable amplifier corresponding to a first signal correlating with the Rf variable amplifier and the analog BB;
   a canceling DC generator, configured to set a canceling DC for each of the gain combinations;
   a storing unit, configured to store the canceling DC corresponding to each of the gain combinations;
   a receiver, configured to receive the second signal carrying an RF DC offset;
   an RF DC offset canceling unit, configured to subtract a canceling DC corresponding to the gain combination corresponding to the second signal carrying the RF DC offset from the second signal carrying an RF DC offset and generate an RF DC offset residual;
   a determining unit, configured to determine whether the RF DC offset residual in the second signal is zero;
   a canceling DC adjusting unit, configured to adjust the canceling DC according to the RF DC offset residual in the second signal, if the RF DC offset residual in the second signal is not zero;
   an output unit, configured to output the second signal subtracted the canceling DC if the RF DC offset residual in the second signal is zero.

7. The system of claim 6, further comprising:
   a detecting unit, configured to detect the gain combination corresponding to the second signal carrying the RF DC offset;
   a canceling DC obtaining unit, configured to select the canceling DC according to the gain combination corresponding to the second signal carrying the RF DC offset.

8. The system of claim 6, further comprising:
   a filtering device, configured to high-pass filter the second signal which carries the RF DC offset residual.

9. The system of claim 8, wherein the filtering device comprises:
   a plurality of high-pass filters, configured to high-pass filter signals which carry RF DC offsets residual;
   a selector, configured to select a high-pass filter according to the gain combination corresponding to the signal.

10. The system of claim 9, wherein the filtering device further comprises:
    a setting module, configured to set a filter uniquely corresponding to each of the gain combinations.

11. The system of claim 6, wherein the canceling DC adjusting unit comprises:
    an adding module, configured to add the RF DC offset residual in the signal to the canceling DC.

12. A system for removing an RF DC offset in a second signal carrying an RF DC offset, comprising:
    a gain combination obtaining unit, configured to detect gain combinations of an RF variable amplifier and an analog BB variable amplifier corresponding to a first signal correlating with the Rf variable amplifier and the analog BB;
    a canceling DC generator, configured to set a canceling DC for each of the gain combinations;
    a storing unit, configured to store the canceling DC corresponding to each of the gain combinations;
    a receiver, configured to receive the second signal carrying an RF DC offset;
    an RF DC offset canceling unit, configured to subtract a canceling DC corresponding to the gain combination corresponding to the second signal carrying the RF DC offset from the second signal carrying an RF DC offset and generate an RF DC offset residual;
    a filter, configured to high-pass filter the second signal carrying the RF DC offset residual and output the signal high-pass filtered;

a canceling DC adjusting unit, configured to adjust the canceling DC according to the RF DC offset residual in the second signal.

13. The system of claim 12, further comprising:
a detecting unit, configured to detect the gain combination corresponding to the second signal carrying the RF DC offset;
a canceling DC obtaining unit, configured to select the canceling DC according to the gain combination corresponding to the second signal carrying the RF DC offset.

14. A system for removing an RF DC offset in a second signal carrying an RF DC offset, comprising:
a gain combination obtaining unit, configured to detect gain combinations of an RF variable amplifier and an analog BB variable amplifier corresponding to a first signal correlating with the Rf variable amplifier and the analog BB;
a canceling DC generator, configured to set a canceling DC for each of the gain combinations;
a storing unit, configured to store the canceling DC corresponding to each of the gain combinations;
a receiver, configured to receive a signal carrying an RF DC offset;
an RF DC offset canceling unit, configured to subtract a canceling DC corresponding to the gain combination corresponding to the second signal carrying the RF DC offset from the second signal and generate an RF DC offset residual;
a canceling DC adjusting unit, configured to adjust the canceling DC according to the RF DC offset residual in the second signal, if the RF DC offset in the second signal is larger than a threshold;
an output unit, configured to output the second signal subtracted the canceling DC, if the RF DC offset residual in the signal is equal to or less than the threshold.

15. The system of claim 14, further comprising:
a detecting unit, configured to detect the gain combination corresponding to the second signal carrying the RF DC offset;
a canceling DC obtaining unit, configured to select a canceling DC according to the gain combination corresponding to the second signal carrying the RF DC offset.

* * * * *